United States Patent
Sakagami et al.

(10) Patent No.: US 11,159,495 B2
(45) Date of Patent: Oct. 26, 2021

(54) TRANSFER DEVICE AND COMMUNICATION NETWORK

(71) Applicant: MITSUBISHI ELECTRIC CORPORATION, Tokyo (JP)

(72) Inventors: Yusuke Sakagami, Tokyo (JP); Ayako Inoue, Tokyo (JP); Sachiko Taniguchi, Tokyo (JP); Ryusuke Kawate, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 256 days.

(21) Appl. No.: 16/471,867

(22) PCT Filed: Feb. 3, 2017

(86) PCT No.: PCT/JP2017/003949
§ 371 (c)(1),
(2) Date: Jun. 20, 2019

(87) PCT Pub. No.: WO2018/142571
PCT Pub. Date: Aug. 9, 2018

(65) Prior Publication Data
US 2020/0127978 A1 Apr. 23, 2020

(51) Int. Cl.
*G06F 15/167* (2006.01)
*H04L 29/06* (2006.01)
*H04L 29/08* (2006.01)

(52) U.S. Cl.
CPC ........ *H04L 63/0428* (2013.01); *H04L 69/324* (2013.01)

(58) Field of Classification Search
CPC ............. H04L 63/0428; H04L 12/2801; H04L 61/6022; H04L 69/324
See application file for complete search history.

(56) References Cited

U.S. PATENT DOCUMENTS

2003/0226009 A1  12/2003  Maeda et al.
2004/0205336 A1  10/2004  Kessler et al.
(Continued)

FOREIGN PATENT DOCUMENTS

CN    101141241 A    3/2008
JP    11-239184 A    8/1999
(Continued)

OTHER PUBLICATIONS

Chinese Office Action dated Dec. 25, 2020 issued in corresponding Chinese Application No. 201780084823.9 with an English Translation.
(Continued)

*Primary Examiner* — Chris Parry
*Assistant Examiner* — Stephen J Houlihan
(74) *Attorney, Agent, or Firm* — Birch, Stewart, Kolasch & Birch, LLP

(57) ABSTRACT

Provided is a transfer device (200) that includes a plurality of ports to and from each of which a layer-2 frame is input and output; a frame identification unit (221) that identifies whether or not the frame has been encrypted; an address filter unit (222) that decides one of the plurality of ports from which the frame is to be output; an encryption necessity determination unit (223) that has an encryption necessity determination table depending on destination information and priority information which are included in each frame, and a decryption necessity determination table depending on the destination information included in each frame, and when the frame has not been encrypted, determines whether or not encryption is necessary for the frame based on the encryption necessity determination table, and when the frame has been encrypted, determines whether or not decryption is necessary for the frame based on the decryption necessity determination table; an encryption decryption (Continued)

processing unit (225) that encrypts the frame for which it has been determined that encryption is necessary and decrypts the frame for which it has been determined that decryption is necessary; and a switching processing unit (224) that outputs the frame to one of the ports. Thus, the transfer device can realize both encrypted communication and plaintext communication.

4 Claims, 20 Drawing Sheets

(56) References Cited

U.S. PATENT DOCUMENTS

| | | | |
|---|---|---|---|
| 2008/0052533 A1* | 2/2008 | Iida | H04L 12/4641 713/189 |
| 2009/0037587 A1 | 2/2009 | Yoshimi et al. | |
| 2009/0103441 A1 | 4/2009 | Nakamura | |
| 2009/0177879 A1 | 7/2009 | Yasuma | |
| 2009/0217032 A1 | 8/2009 | Guan | |
| 2014/0055555 A1 | 2/2014 | Imai | |
| 2014/0354767 A1 | 12/2014 | Imai | |

FOREIGN PATENT DOCUMENTS

| | | |
|---|---|---|
| JP | 2004-15141 A | 1/2004 |
| JP | 2005-295468 A | 10/2005 |
| JP | 2006-524959 A | 11/2006 |
| JP | 2009-164960 A | 7/2009 |
| JP | 4308297 B2 | 8/2009 |
| JP | 5060081 B2 | 10/2012 |
| JP | 2013-106071 A | 5/2013 |
| WO | WO 2006/093079 A1 | 9/2006 |

OTHER PUBLICATIONS

IEEE Standard for Local and metropolitan area networks "Media Access Control (MAC) Security" IEEE Computer Society, IEEE Std 802.1AE-2006, total 153 pages.

IEEE Standard for Local and metropolitan area networks "Port-Based Network Access Control", IEEE Computer Society, IEEE Std 802.1X-2004 (Revision of IEEE Std 802.1X-2001), total 178 pages.

International Search Report, issued in PCT/JP2017/003949, PCT/ISA/210, dated Apr. 18, 2017.

* cited by examiner

Fig. 6

| DESTINATION MAC ADDRESS 311 | TRANSFER DESTINATION PORT | TRANSFER DESTINATION TERMINAL DEVICE |
|---|---|---|
| 000A01AAA001 | 210-1 | TERMINAL DEVICE 10a |
| 000A01AAA002 | 210-2 | TERMINAL DEVICE 10b |
| 000A01AAB011 | 210-3 | TERMINAL DEVICE 10c |
| 000A01AAC001 | 210-3 | TERMINAL DEVICE 10d |
| 000A01ABB002 | 210-3 | TERMINAL DEVICE 10e |
| 000A01ABC012 | 210-1 | TERMINAL DEVICE 10f |

Fig. 9

| US 313 | TRANSFER DESTINATION TERMINAL DEVICE | | | | | |
|---|---|---|---|---|---|---|
| | TERMINAL DEVICE 10a | TERMINAL DEVICE 10b | TERMINAL DEVICE 10c | TERMINAL DEVICE 10d | TERMINAL DEVICE 10e | TERMINAL DEVICE 10f |
| 7 | ENCRYPTION | PLAINTEXT | ENCRYPTION | PLAINTEXT | PLAINTEXT | ENCRYPTION |
| 6 | ENCRYPTION | PLAINTEXT | ENCRYPTION | PLAINTEXT | PLAINTEXT | ENCRYPTION |
| 5 | ENCRYPTION | PLAINTEXT | ENCRYPTION | PLAINTEXT | PLAINTEXT | PLAINTEXT |
| 4 | ENCRYPTION | PLAINTEXT | PLAINTEXT | PLAINTEXT | PLAINTEXT | PLAINTEXT |
| 3 | ENCRYPTION | PLAINTEXT | PLAINTEXT | PLAINTEXT | PLAINTEXT | PLAINTEXT |
| 2 | ENCRYPTION | PLAINTEXT | PLAINTEXT | PLAINTEXT | PLAINTEXT | PLAINTEXT |
| 1 | ENCRYPTION | PLAINTEXT | PLAINTEXT | PLAINTEXT | PLAINTEXT | ENCRYPTION |
| 0 | ENCRYPTION | PLAINTEXT | PLAINTEXT | PLAINTEXT | PLAINTEXT | ENCRYPTION |

Fig. 10

| US 313 | TRANSFER DESTINATION TERMINAL DEVICE | | | | | |
|---|---|---|---|---|---|---|
| | TERMINAL DEVICE 10a | TERMINAL DEVICE 10b | TERMINAL DEVICE 10c | TERMINAL DEVICE 10d | TERMINAL DEVICE 10e | TERMINAL DEVICE 10f |
| 7 | ENCRYPTED | DECRYPTION | ENCRYPTED OR DISCARD | ENCRYPTED OR DISCARD | ENCRYPTED OR DISCARD | ENCRYPTED |
| 6 | ENCRYPTED | DECRYPTION | ENCRYPTED OR DISCARD | ENCRYPTED OR DISCARD | ENCRYPTED OR DISCARD | ENCRYPTED |
| 5 | ENCRYPTED | DECRYPTION | ENCRYPTED OR DISCARD | ENCRYPTED OR DISCARD | ENCRYPTED OR DISCARD | ENCRYPTED |
| 4 | ENCRYPTED | DECRYPTION | ENCRYPTED OR DISCARD | ENCRYPTED OR DISCARD | ENCRYPTED OR DISCARD | ENCRYPTED |
| 3 | ENCRYPTED | DECRYPTION | ENCRYPTED OR DISCARD | ENCRYPTED OR DISCARD | ENCRYPTED OR DISCARD | ENCRYPTED |
| 2 | ENCRYPTED | DECRYPTION | ENCRYPTED OR DISCARD | ENCRYPTED OR DISCARD | ENCRYPTED OR DISCARD | ENCRYPTED |
| 1 | ENCRYPTED | DECRYPTION | ENCRYPTED OR DISCARD | ENCRYPTED OR DISCARD | ENCRYPTED OR DISCARD | ENCRYPTED |
| 0 | ENCRYPTED | DECRYPTION | ENCRYPTED OR DISCARD | ENCRYPTED OR DISCARD | ENCRYPTED OR DISCARD | ENCRYPTED |

Fig.14

| CRYPTOGRAPHIC KEY | TRANSFER DESTINATION PORT | |
| --- | --- | --- |
| | TERMINAL DEVICE 10 | TRANSFER DEVICE 200 |
| SHARED | DECRYPTION | ENCRYPTED |
| NOT SHARED | DISCARD | ENCRYPTED OR DISCARD |

Fig. 16

| US 313 | PRIORITY IDENTIFICATION RESULT |
|---|---|
| 0, 1 | LOW PRIORITY |
| 2, 3 | MEDIUM PRIORITY |
| 4, 5 | HIGH PRIORITY |
| 6, 7 | HIGHEST PRIORITY |

Fig. 17

| PRIORITY IDENTIFICATION RESULT | TRANSFER DESTINATION TERMINAL DEVICE | | | | | |
|---|---|---|---|---|---|---|
| | TERMINAL DEVICE 10a | TERMINAL DEVICE 10b | TERMINAL DEVICE 10c | TERMINAL DEVICE 10d | TERMINAL DEVICE 10e | TERMINAL DEVICE 10f |
| HIGHEST PRIORITY | ENCRYPTION | PLAINTEXT | ENCRYPTION | PLAINTEXT | PLAINTEXT | ENCRYPTION |
| HIGH PRIORITY | ENCRYPTION | PLAINTEXT | ENCRYPTION | PLAINTEXT | PLAINTEXT | PLAINTEXT |
| MEDIUM PRIORITY | ENCRYPTION | PLAINTEXT | PLAINTEXT | PLAINTEXT | PLAINTEXT | PLAINTEXT |
| LOW PRIORITY | ENCRYPTION | PLAINTEXT | PLAINTEXT | PLAINTEXT | PLAINTEXT | ENCRYPTION |

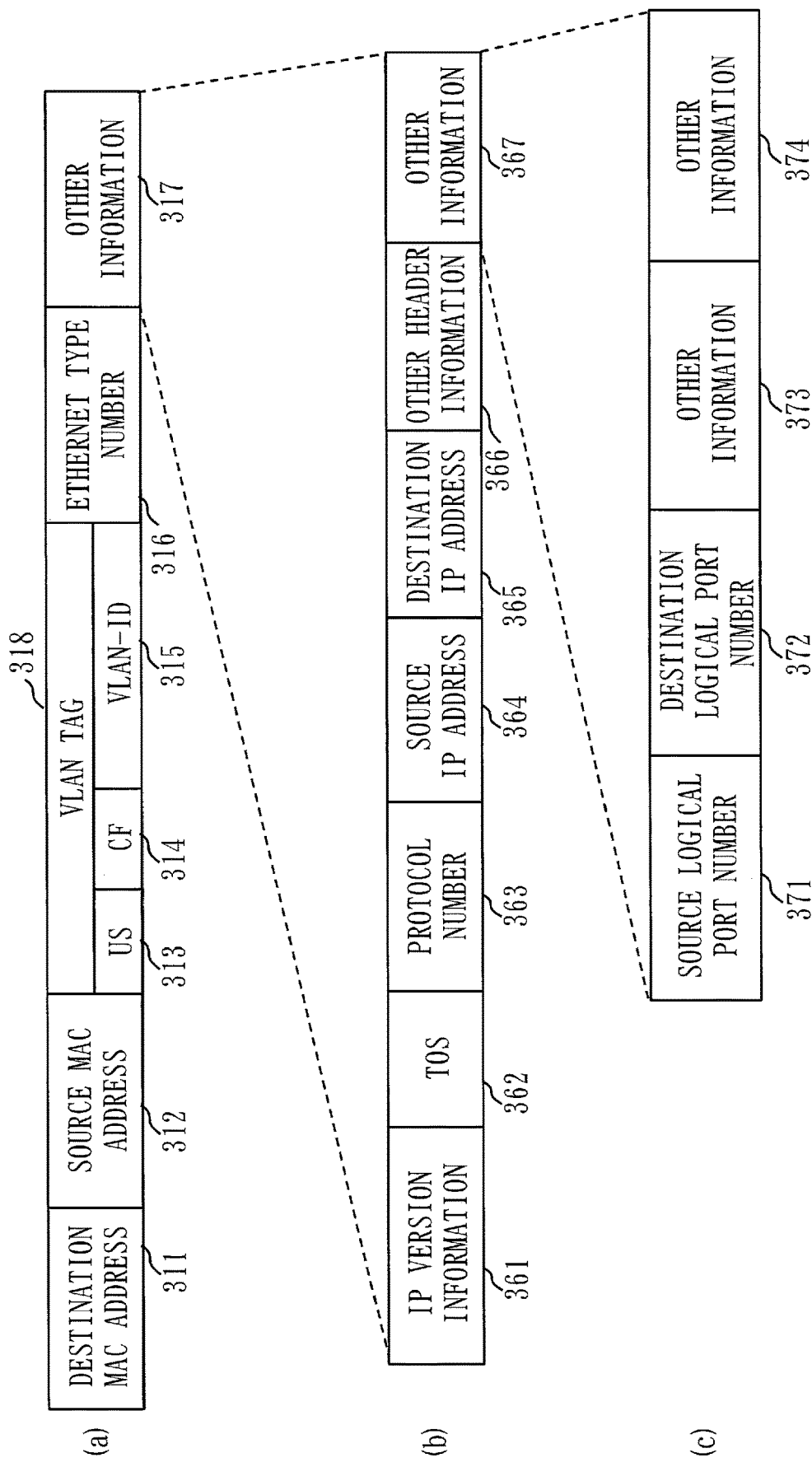

TRANSFER DEVICE AND COMMUNICATION NETWORK

TECHNICAL FIELD

The present invention relates to a transfer device that transfers data in a network.

BACKGROUND ART

Conventionally, Media Access Control Security (MACsec) standardized by the Institute of Electrical and Electronics Engineers (IEEE) 802.1AE is available as encryption and authentication techniques in a layer-2 network having transfer devices such as switching hubs. In MACsec, only encrypted communication between adjacent transfer devices (link by link) is assumed, and all information on the transfer destination of a frame to be transferred (transfer frame) except for a MAC address is encrypted. Therefore, a problem is that if a transfer device that does not conform to MACsec is inserted in a transfer path, encrypted information cannot be interpreted and information on the transfer destination except for the MAC address cannot be acquired. As a result, transfer can be controlled based only on the MAC address, and in a layer-2 network where a VLAN is configured, transfer frames cannot be transferred appropriately for the VLAN configuration.

In order to solve the above-described problem, Patent Literature 1 proposes a transfer device in which a transfer frame is configured such that in addition to a MAC address, a VLAN-ID for identifying a virtual local area network (VLAN) is also information not to be encrypted. Therefore, even if a transfer device on a transfer path cannot interpret encrypted information in a layer-2 network where a VLAN is configured, the transfer device can control transfer based on not only the MAC address but also the VLAN-ID.

CITATION LIST

Patent Literature

Patent Literature 1: JP 5060081 B (FIG. 3A, FIG. 3B)

SUMMARY OF INVENTION

Technical Problem

However, the transfer device of Patent Literature 1 only determines whether or not the transfer frame needs to be encrypted based on the VLAN-ID. Therefore, a problem is that although either encrypted communication or plaintext communication can be selected for each VLAN, finer control cannot be performed for each transfer frame based on information other than the VLAN-ID.

The present invention has been devised to solve the above-described problem, and it is an object to realize a transfer device that can switch between encrypted communication and plaintext communication depending on the attribute of each transfer frame even for transfer frames in the same VLAN.

Solution to Problem

In order to solve the above-described problem and achieve the object, a transfer device according to the present invention includes: a plurality of ports to and from each of which a frame of a layer 2 is input and output; a frame identification unit to identify whether or not the frame received at one of the plurality of ports has been encrypted; an address filter unit to decide one of the plurality of ports from which the frame is to be output; an encryption necessity determination unit that has an encryption necessity determination table in which whether or not encryption is necessary for each frame is defined depending on destination information and priority information which are included in each frame, and a decryption necessity determination table in which whether or not decryption is necessary is defined depending on the destination information included in each frame, and when the frame identification unit has identified the frame as not being encrypted, determines whether or not encryption is necessary for the frame based on the encryption necessity determination table, and when the frame identification unit has identified the frame as being encrypted, determines whether or not decryption is necessary for the frame based on the decryption necessity determination table; an encryption decryption processing unit to encrypt the frame for which the encryption necessity determination unit has determined that encryption is necessary, and decrypt the frame for which the encryption necessity determination unit has determined that decryption is necessary; and a switching processing unit to output the frame for which it has been determined that encryption is not necessary or decryption is not necessary and the frame that has been encrypted or decrypted to the port decided by the address filter unit.

Advantageous Effects of Invention

The transfer device according to the present invention has the above-described configuration, so that encrypted communication or plaintext communication can be applied on a per frame basis, depending on the attributes of transfer frames belonging to the same VLAN.

BRIEF DESCRIPTION OF DRAWINGS

FIG. 6 is a database configuration diagram illustrating an example of a transfer destination correspondence table in the first embodiment of the present invention;

FIG. 9 is a database configuration diagram illustrating an example of an encryption necessity determination table in the first embodiment of the present invention;

FIG. 10 is a database configuration diagram illustrating an example of a decryption necessity determination table in the first embodiment of the present invention;

FIG. 14 is a database configuration diagram illustrating an example of a decryption necessity determination table in the first embodiment of the present invention;

FIG. 16 is a priority identification result correspondence table illustrating an example of a priority identification result in the second embodiment of the present invention;

FIG. 17 is a database configuration diagram illustrating an example of an encryption necessity determination table in the second embodiment of the present invention;

FIG. 18 is a frame configuration diagram illustrating an example of the data configuration of a frame in the second embodiment of the present invention;

Figure 1:
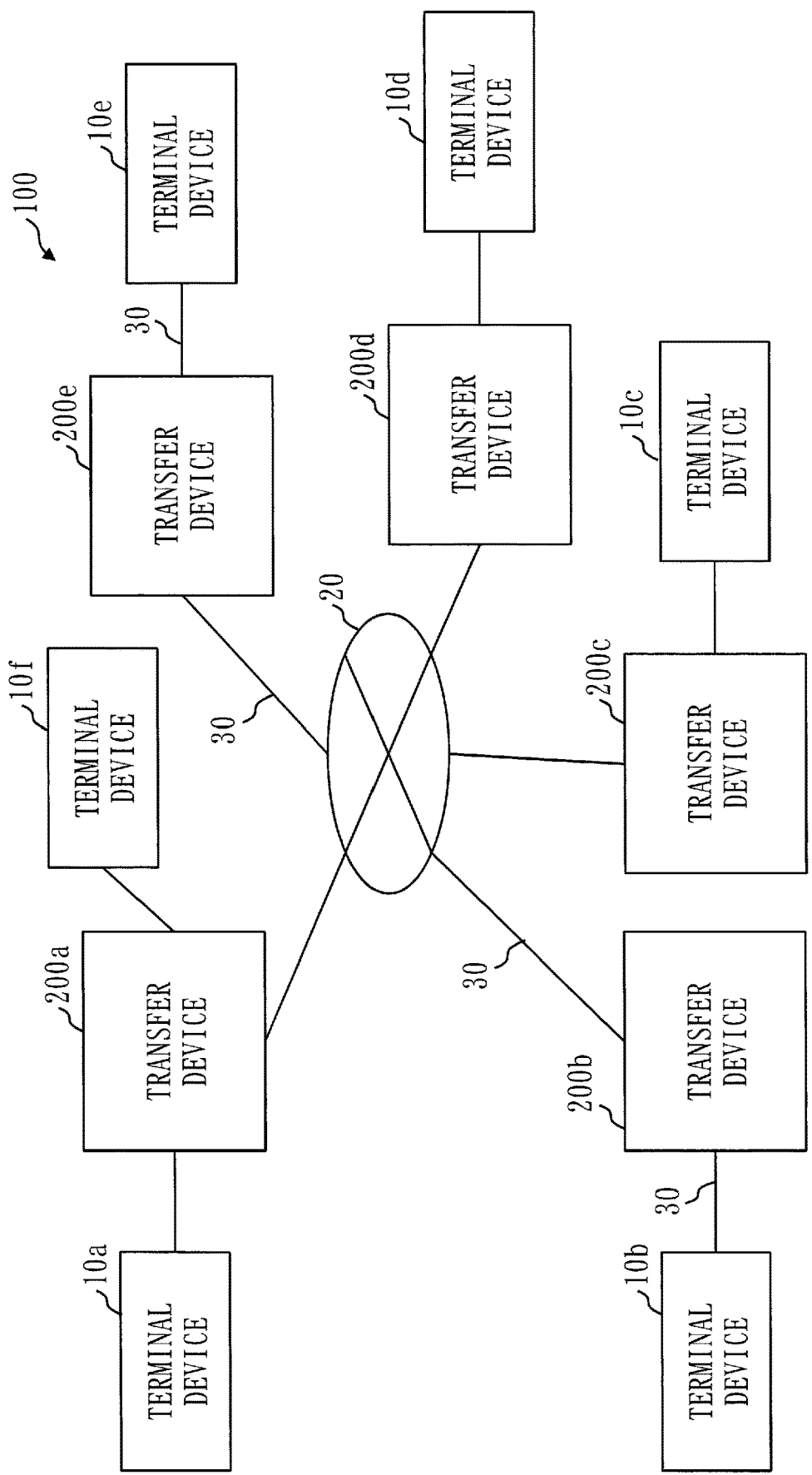
FIG. 1 is a configuration diagram illustrating an example of a communication network according to a first embodiment of the present invention.

Embodiments of a transfer device according to the present invention will be described in detail hereinafter with reference to the drawings. In the drawings referred to hereinafter, the same or corresponding parts are denoted by the same reference signs. Note that the present invention is not limited by these embodiments.

FIRST EMBODIMENT

FIG. 1 is a configuration diagram illustrating an example of a communication network according to a first embodiment of the present invention. In FIG. 1, a communication network 100 includes terminal devices 10 (10a to 101), a relay network 20, transmission lines 30, and transfer devices 200 (200a to 200e). For the sake of description, it is assumed that the communication network 100 includes six terminal devices 10 and five transfer devices 200. However, this is not limiting and the communication network 100 may include any number of terminal devices 10 and any number of transfer devices 200. The communication network 100 is a network that transmits Media Access Control (MAC) frames supporting VLANs.

The terminal device 10 is a device that performs communication for transmitting and receiving data to and from other devices connected to the communication network 100, and is a personal computer or the like.

The relay network 20 is a network that interconnects the transfer devices 200, and is a layer-2 network that relays information among the transfer devices 200.

The transmission line 30 is a transmission line connecting the terminal device 10 and the transfer device 200 or connecting the transfer device 200 and the relay network 20, and is a coaxial cable, an optical cable, a LAN cable, or the like. Devices connected via the transmission line 30 and the relay network 20 can transmit and receive data to and from each other.

The transfer device 200 is connected with the terminal device 10 and the relay network 20 via the transmission lines 30, and transfers received data to the connected terminal device 10 or the relay network 20. A transfer method of the transfer device 200 will be described in detail later.

Figure 2:
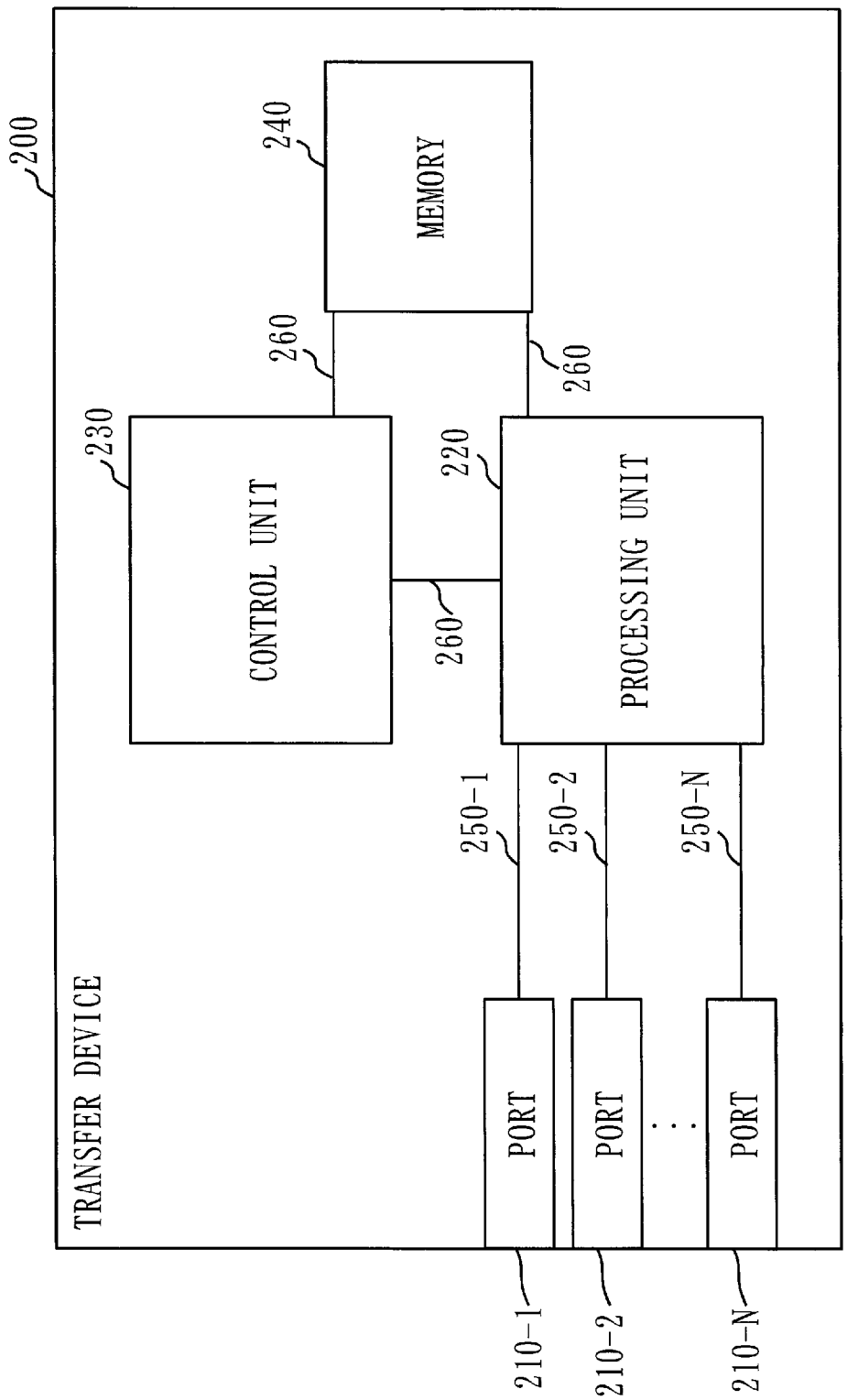
FIG. 2 is a structural diagram illustrating an example of a transfer device in the first embodiment of the present invention.

Next, a hardware configuration of the transfer device 200 will be described with reference to FIG. 2. FIG. 2 is a structural diagram illustrating an example of the transfer device in the first embodiment of the present invention. In FIG. 2, the transfer device 200 includes an N (N is an integer of 2 or more) number of ports 210 (210-1 to 210-N) as interfaces to the outside, a processing unit 220 that performs processing, a control unit 230 that controls the processing unit 220, a memory 240 in which data is recorded, interfaces 250 (250-1 to 250-N) that connect the ports 210 and the processing unit 220, and local buses 260 that interconnect the processing unit 220, the control unit 230, and the memory 240.

The processing unit 220 performs transfer processing of transfer frames. The processing unit 220 may be a field-programmable gate array (FPGA), large scale integration (LSI), or the like.

The control unit 230 controls the processing unit 220 such as changing settings. The control unit 230 may be a central processing unit (CPU) or the like.

In the memory 240, a transfer processing program which is called from the processing unit 220 for transferring a transfer frame, a control program which is called from the control unit 230, and various databases are recorded.

The interface 250 may be an interface based on a general standard such as the media-independent interface (MID or 10 Gigabit Attachment Unit Interface (XAUI).

The local bus 260 may be an expansion bus such as a Peripheral Component Interconnect (PCI) bus or PCI Express (registered trademark).

The processing unit 220 and the control unit 230 are described as separate units, but may be constituted as an integrated processing unit by a CPU or the like.

Figure 3:
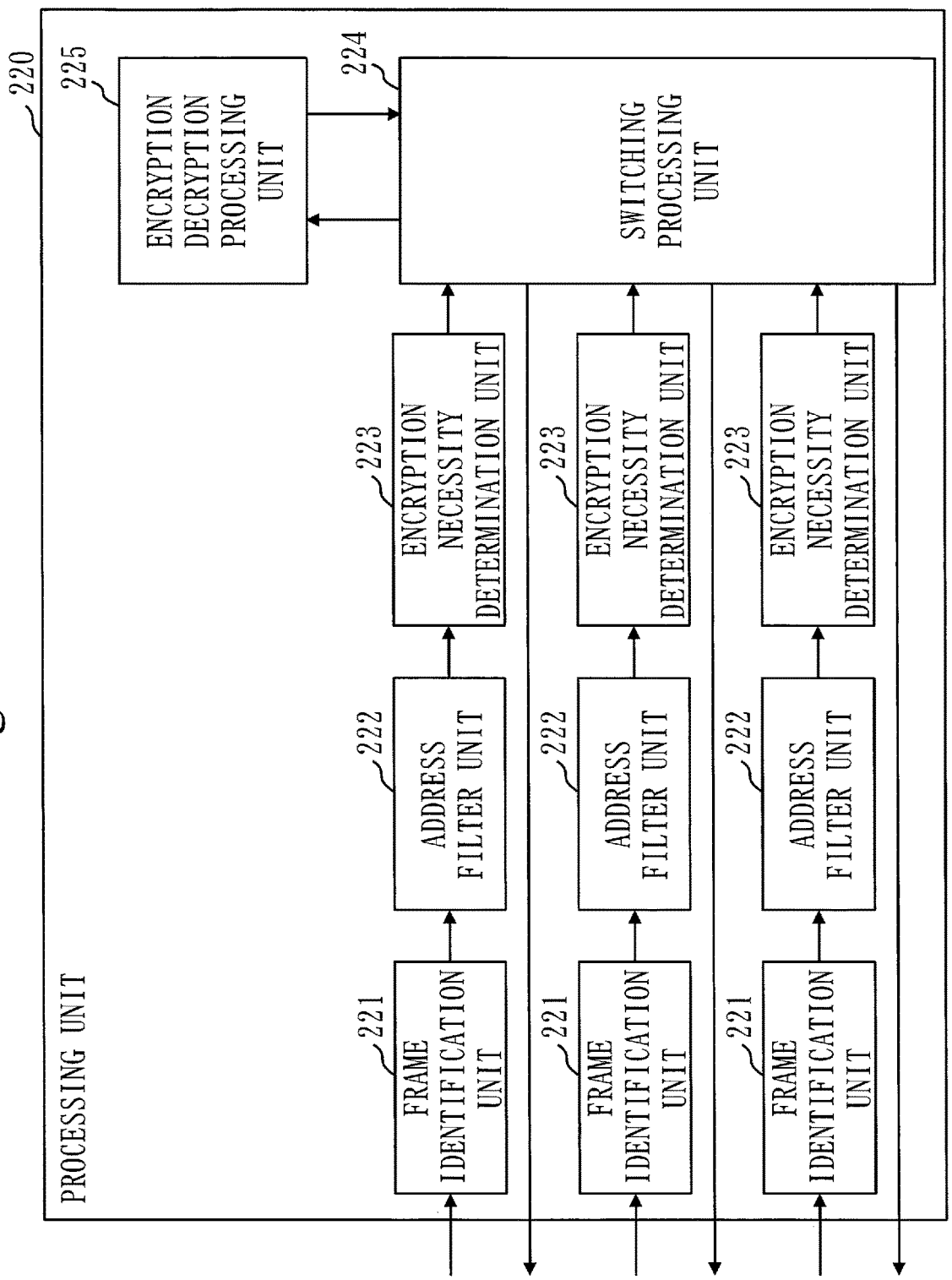
FIG. 3 is a configuration diagram illustrating an example of the configuration of a processing unit in the first embodiment of the present invention.

FIG. 3 is a configuration diagram illustrating an example of the configuration of the processing unit in the first embodiment of the present invention. For the sake of description, it is assumed that three of the ports 210 are connected to the processing unit 220. Although not illustrated, the three ports connected to the processing unit 220 are 210-1, 210-2, and 210-3.

In FIG. 3, the processing unit 220 includes frame identification units 221, address filter units 222, encryption necessity determination units 223, a switching processing unit 224, and an encryption decryption processing unit 225.

The frame identification unit 221 identifies whether a frame received from the connected port 210 is an encrypted frame, and if encrypted, transmits information indicating that the frame has been encrypted to the encryption necessity determination unit 223. An identification method of the frame identification unit 221 will be described in detail later.

Figure 4:
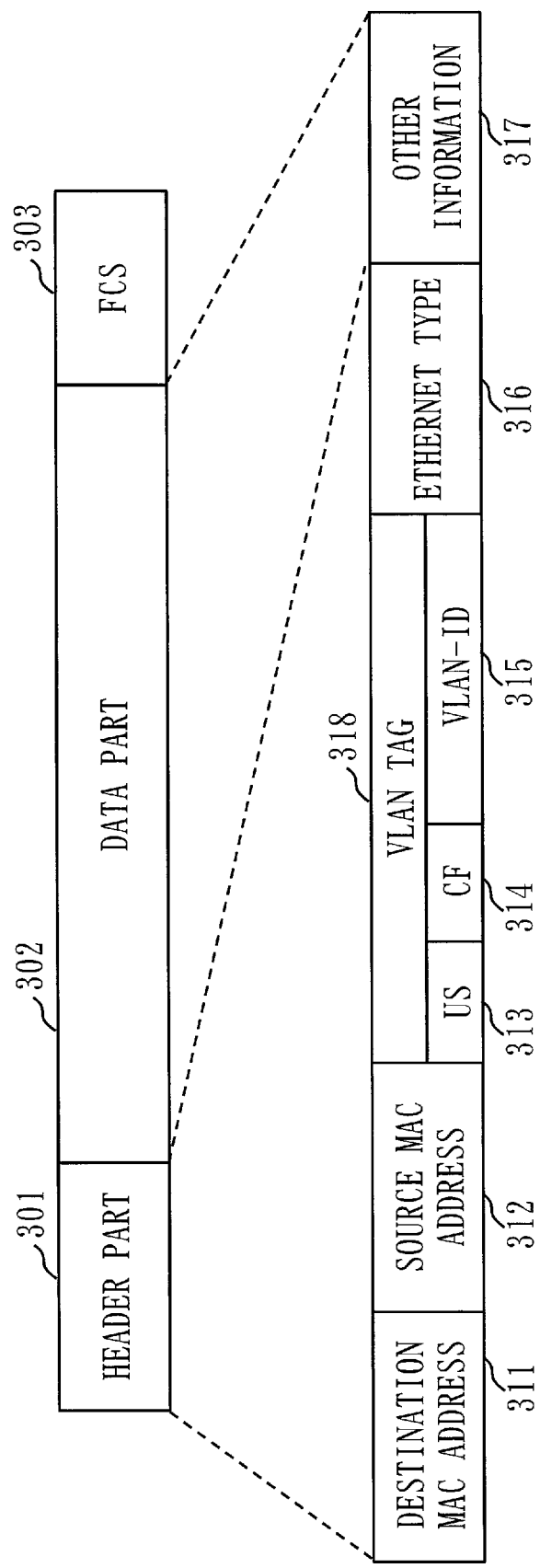
FIG. 4 is a frame configuration diagram illustrating an example of the data configuration of a frame in the first embodiment of the present invention.

FIG. 4 is a frame configuration diagram illustrating an example of the data configuration of a MAC frame in the first embodiment of the present invention. The frame format illustrated in FIG. 4 is formed by adding a VLAN tag 318 to an Ethernet (registered trademark) frame in a DIX format, and includes a header part 301, a data part 302 containing data to be transmitted by the MAC frame, and a Frame Check Sequence (FCS) 303 which is information for checking whether the frame has an error. Further, the header part 301 includes a destination MAC address 311, a source MAC address 312, the VLAN tag 318, and an Ethernet type 316. The VLAN tag 318 includes a User Priority (US) 313, a Canonical Format (CF) 314, and a VLAN-ID 315.

The US 313 is a user priority level as specified by IEEE 801.D, and its value ranges from 0 to 7, 0 being specified as the lowest priority and 7 being specified as the highest priority. The CF 314 is information indicating whether the destination MAC address and the source MAC address conform to the standard format. The VLAN-ID 315 is ID information indicating the VLAN to which the frame belongs.

The Ethernet type 316 is a number for identifying the upper-layer communication protocol. For example, 0x0800 indicates the Internet Protocol version 4 (IPv4) communication protocol. This embodiment is described using the MAC frame based on the DIX format as an example. However, the present invention is not limited to only the DIX format, and may also be applied to transmission of MAC frames based on the IEEE 802.3 standard including the Logical Link Control/Subnetwork Access Protocol (LLC/SNAP) and other layer-2 frames, for example.

Figure 5:
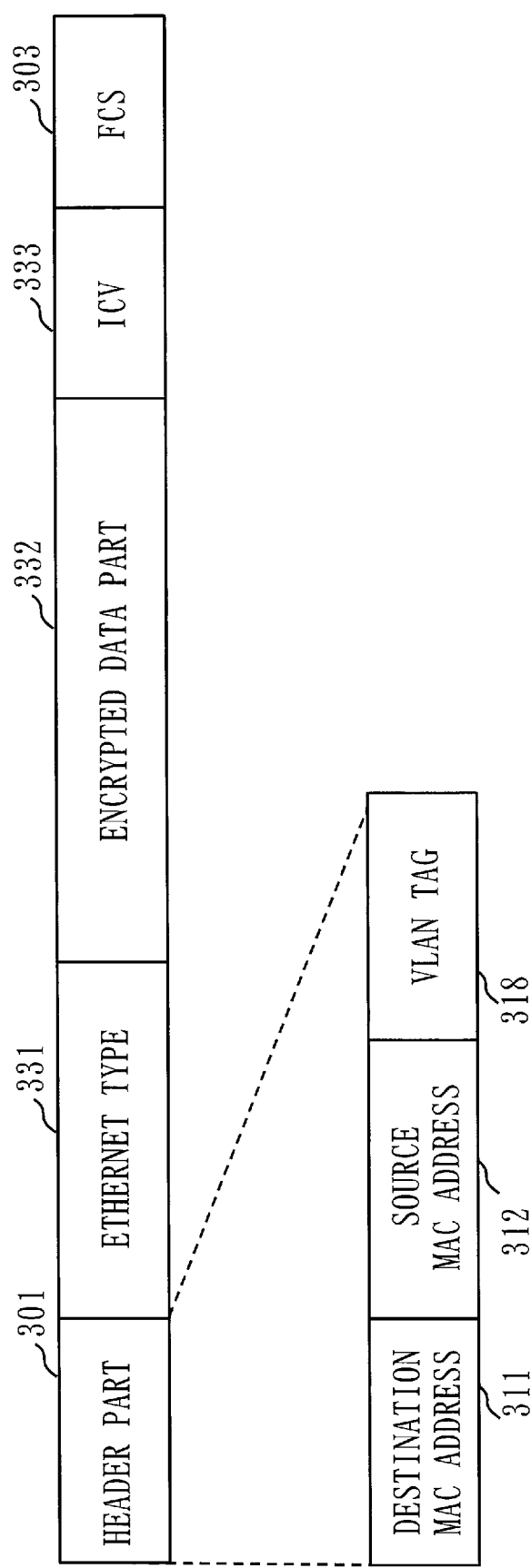
FIG. 5 is a frame configuration diagram illustrating an example of the data configuration of an encrypted frame in the first embodiment of the present invention.

Next, the configuration of an encrypted MAC frame (encrypted frame) according to this embodiment will be described with reference to FIG. 5. FIG. 5 is a frame configuration diagram illustrating an example of the data configuration of the encrypted frame.

In FIG. 5, the configuration of the encrypted frame is basically the same as that of the MAC frame illustrated in FIG. 4. The differences are that a specific value indicating an encrypted MAC frame is set in an Ethernet type 331, and that an Integrity Check Value (ICV) 333 which is integrity check data for encrypted data is added. It is assumed here that 0x88E5 indicating a MACsec frame as specified by IEEE 802.1AE is used as the Ethernet type 331. An encrypted data part 332 is data obtained by encrypting the Ethernet type 316 and the data part 302 of the MAC frame illustrated in FIG. 4.

Referring back to FIG. 3, the frame identification unit 221 refers to the information immediately following the VLAN tag in the received frame, namely the Ethernet type 316 in FIG. 4 or the Ethernet type 331 in FIG. 5, to identify whether or not the input frame is an encrypted frame. If the frame is identified as an encrypted frame, the frame identification unit 221 adds an encrypted flag 341 to the frame and transmits the frame to the address filter unit 222. Instead of adding the encrypted flag 341 to the frame by the frame identification unit 221, a signal line connecting the frame identification unit 221 and the encryption necessity determination unit 223 may be provided so as to directly transmit information indicating that the frame has been encrypted from the frame identification unit 221 to the encryption necessity determination unit 223.

The address filter unit 222 compares the destination MAC address 311 of the frame received from the frame identification unit 221 with a transfer destination correspondence table to decide the transfer destination, and transmits information on the decided transfer destination to the encryption necessity determination unit 223.

FIG. 6 is a database configuration diagram illustrating an example of the transfer destination correspondence table in the first embodiment of the present invention. The transfer destination correspondence table is recorded in the memory 240.

In FIG. 6, the transfer destination correspondence table is a correspondence table in which a correspondence relationship is set to associate the destination MAC address 311 with a port which is the transfer destination and a transfer destination terminal device which is the final transfer destination. The address filter unit 222 compares the destination MAC address 311 of the received frame with the transfer destination correspondence table to decide the transfer destination. For example, when the destination MAC address 311 is 000A01AAA001, the address filter unit 222 refers to the transfer destination correspondence table illustrated in FIG. 6, and decides that the port 210-1 is the port of the transfer destination (transfer destination port) and the terminal device 10a is the final transfer destination. The transfer destination correspondence table illustrated in FIG. 6 is recorded in the memory 240, and may be automatically downloaded via the network or may be entered manually by a user.

Figure 7:
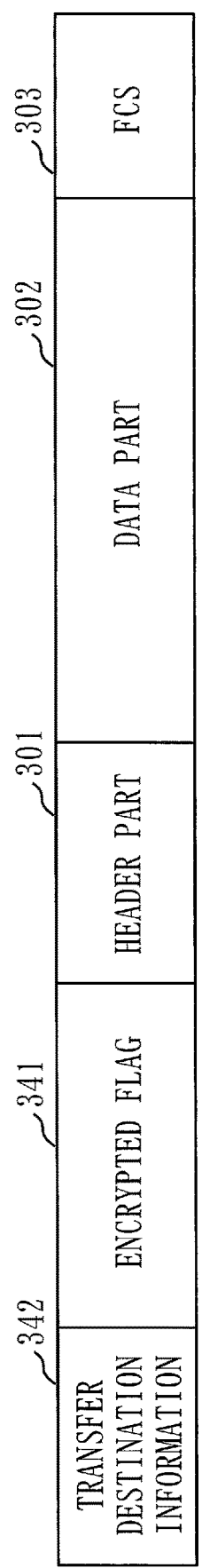
FIG. 7 is a frame configuration diagram illustrating an example of the data configuration of a transmission frame of an address filter unit in the first embodiment of the present invention.

The address filter unit 222 adds the port 210-1 decided as the transfer destination port and the terminal device 10a to the frame as transfer destination information 342, and transmits the frame to the encryption necessity determination unit 223. FIG. 7 is a frame configuration diagram illustrating an example of the data configuration of a frame output by the address filter unit in the first embodiment of the present invention. In FIG. 7, the configuration of the frame output by the address filter unit 222 is such that the MAC frame illustrated in FIG. 4 has additionally the encrypted flag 341 added in the frame identification unit 221 and the transfer destination information 342 added in the address filter unit 222.

In the example of the transfer destination correspondence table described above, the destination MAC address 311 is associated with one transfer destination port and one transfer destination terminal device as illustrated in FIG. 6. However, this is not limiting and the destination MAC address 311 may be a multicast address associated with two or more transfer destination ports and two or more transfer destination terminal devices.

For a specific destination MAC address 311, the transfer destination correspondence table may be set to indicate that all frames are to be discarded, or a frame is to be output from all ports excluding the receiving port, instead of indicating the transfer destination terminal device. This allows the transfer device 200 not only to transfer a frame to the transfer destination terminal device, but also to discard all frames or to output a frame from all ports excluding the receiving port.

In the description above, only destination information is added to the frame as the transfer destination information 342. However, this is not limiting and source information may be added. For example, reference may be made to a correspondence table indicating a correspondence relationship between the source MAC address 312 and a source terminal device from which a frame is transmitted, and the source terminal device may be added to the frame as the transfer destination information 342.

For a specific source MAC address 312, the correspondence table indicating the correspondence relationship of the source terminal device may be set to indicate that all frames are to be discarded, or a frame is to be output from all ports excluding the receiving port, instead of indicating the source terminal device. This allows the transfer device 200 not only to transfer a frame to the transfer destination terminal device, but also to discard all frames or to output a frame from all ports excluding the receiving port.

As a method by which the address filter unit 222 transmits the transfer destination information 342 to the encryption necessity determination unit 223, the method of adding the transfer destination information 342 to the frame has been described. However, this is not limiting and a signal line connecting the address filter unit 222 and the encryption necessity determination unit 223 may be provided so as to directly transmit the transfer destination information 342 to the encryption necessity determination unit 223. When the signal line is provided for transmission in this way, the data volume of the frame to be transmitted is not increased. This has the effect of allowing transmission of the transfer destination information 342 having a larger data volume.

Referring back to FIG. 3, if the received frame does not have the encrypted flag 341, the encryption necessity determination unit 223 determines that the frame is a plaintext frame, compares the transfer destination information 342 with an encryption necessity determination table to decide whether or not encryption is necessary, and transmits information on the decision as to whether or not encryption is necessary to the switching processing unit 224. On the other hand, if the received frame has the encrypted flag 341, the encryption necessity determination unit 223 determines that the frame is an encrypted frame, compares the transfer destination information 342 with a decryption necessity determination table to decide whether or not decryption is necessary, and transmits information on the decision as to whether or not decryption is necessary to the switching processing unit 224.

First, a case where the received frame does not have the encrypted flag 341 will be described.

Figure 8:
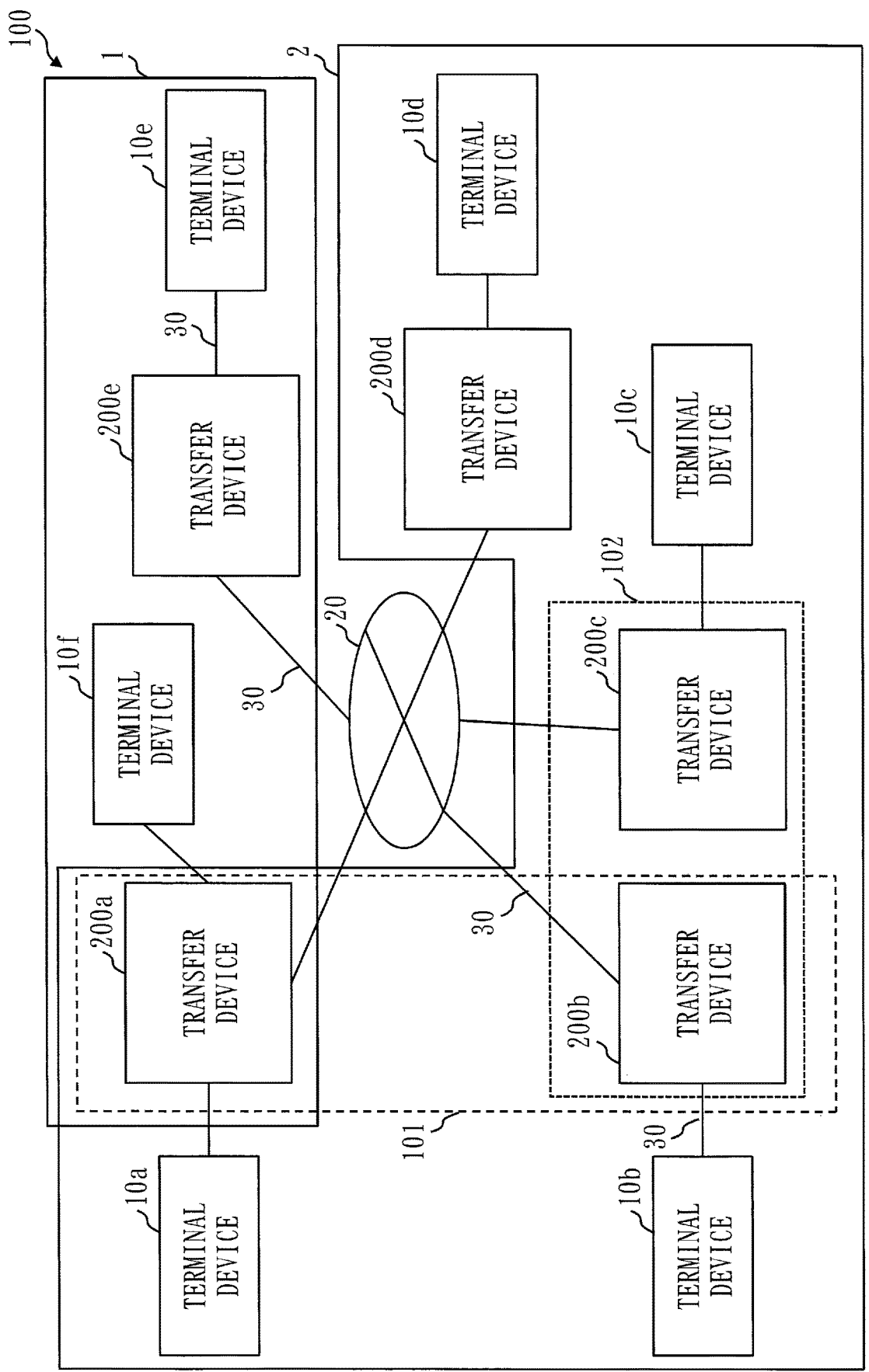
FIG. 8 is a configuration diagram illustrating an example of a relationship among devices in the communication network according to the first embodiment of the present invention.

FIG. 8 is a configuration diagram illustrating an example of a relationship among the devices in the communication network according to the first embodiment of the present invention. The terminal devices 10, the relay network 20, the transmission lines 30, and the transfer devices 200 are substantially the same as those in FIG. 1, and thus description will be omitted.

In FIG. 8, solid lines indicate devices belonging to the same VLAN, and dotted lines indicate devices sharing a cryptographic key used for encryption and decryption. A solid line 1 denotes VLAN1 whose VLAN-ID 315 is 1, and the terminal devices 10e and 10f and the transfer devices 200a and 200e belong to VLAN1. A solid line 2 denotes VLAN2 whose VLAN-ID 315 is 2, and the terminal devices 10a, 10b, 10c, and 10d and the transfer devices 200a, 200b, 200c, and 200d belong to VLAN2.

A dotted line 101 indicates devices sharing a cryptographic key 1, and the transfer devices 200a, 200b, and 200e share the cryptographic key 1. A dotted line 102 indicates devices sharing a cryptographic key 2, and the transfer devices 200b and 200c share the cryptographic key 2. A cryptographic key is stored in the memory 240 of each transfer device 200 in association with a transfer destination terminal device. As a method by which the encryption necessity determination unit 223 determines the cryptographic key to be used for encryption, the encryption necessity determination unit 223 may compare a correspondence table of shared cryptographic keys and transfer destination terminal devices recorded in the memory 240 with the transfer destination terminal device decided by the address filter unit 222 so as to determine the cryptographic key, for example.

FIG. 9 is a database configuration diagram illustrating an example of the encryption necessity determination table in the first embodiment of the present invention. FIG. 9 is the encryption necessity determination table corresponding to the transfer device 200b in FIG. 8. The encryption necessity determination table is a database recorded in the memory 240 and referred to by the encryption necessity determination unit 223.

FIG. 9 is the encryption necessity determination table on the basis of a combination of the US 313 included in a received frame and the transfer destination terminal device included in the transfer destination information 342 transmitted from the address filter unit 222. Note that "plaintext" indicates that encryption is not to be performed.

FIG. 9 indicates that when the transfer destination terminal device is the terminal device 10a, the transfer device 200b encrypts and then transmits the frame in all cases where the US 313 is 0 to 7. Since the transfer device 200a connected to the terminal device 10a and the transfer device 200b share the cryptographic key 1, the frame from the transfer device 200b to the terminal device 10a can be encrypted.

FIG. 9 indicates that when the transfer destination terminal device is the terminal device 10b, the transfer device 200b transmits the frame in plaintext in all cases where the US 313 is 0 to 7. Since the terminal device 10b is directly connected with the transfer device 200b, the transfer device 200b does not need to encrypt the frame and transmits the frame in plaintext.

FIG. 9 indicates that when the transfer destination terminal device is the terminal device 10c, the transfer device 200b transmits the frame in plaintext in cases where the US 313 is 0 to 3, and encrypts and then transmits the frame in cases where the US 313 is 4 to 7. Since the transfer device 200c connected to the terminal device 10c and the transfer device 200b share the cryptographic key 2, the frame from the transfer device 200b to the terminal device 10c can be encrypted.

FIG. 9 indicates that when the transfer destination terminal device is the terminal device 10d, the transfer device 200b transmits the frame in plaintext in all cases where the US 313 is 0 to 7. Although the terminal device 10d and the transfer device 200b belong to the same VLAN1, the transfer device 200d connected to the terminal device 10d and the transfer device 200b do not share a cryptographic key. Thus, the frame from the transfer device 200b to the terminal device 10d cannot be encrypted and is transmitted in plaintext in all the cases.

FIG. 9 indicates that when the transfer destination terminal device is the terminal device 10e, the transfer device 200b transmits the frame in plaintext in all cases where the US 313 is 0 to 7. Since the transfer device 200e connected to the terminal device 10e and the transfer device 200b do not share a cryptographic key, the frame from the transfer device 200b to the terminal device 10e cannot be encrypted and is transmitted in plaintext in all the cases.

FIG. 9 indicates that when the transfer destination terminal device is the terminal device 10f, the transfer device 200b transmits the frame in plaintext in cases where the US 313 is 2 to 5, and encrypts and then transmits the frame in cases where the US 313 is 0 to 1 and 6 to 7. In this way, detailed settings can be made based on the priorities of frames. Since the transfer device 200a connected to the terminal device 10f and the transfer device 200b share the cryptographic key 1, the frame from the transfer device 200b to the terminal device 10f can be encrypted.

In both a plaintext frame and an encrypted frame transmitted from the transfer device 200b, the VLAN tag can be read and relay processing can be performed in accordance with the VLAN-ID 315 in the relay network 20. For example, since the terminal devices 10e and 10f belong to VLAN1 and their belonging VLAN is different from that of the transfer device 200b belonging to VLAN2, neither a plaintext frame nor an encrypted frame transmitted from the transfer device 200b is transferred to the terminal devices 10e and 10f.

The encryption necessity determination unit 223 compares the US 313 and the transfer destination information 342 with the encryption necessity determination table illustrated in FIG. 9 to determine whether or not encryption is necessary, and upon determining that encryption is to be performed, adds an encryption flag 343 to the frame and transmits the frame to the switching processing unit 224.

Next, a case where the received frame has the encrypted flag 341 will be described.

FIG. 10 is a database configuration diagram illustrating an example of the decryption necessity determination table in the first embodiment of the present invention. The decryption necessity determination table corresponds to the transfer device 200b in FIG. 8 and it is assumed that the cryptographic key 1 is used. FIG. 10 is a database recorded in the memory 240 and referred to by the encryption necessity determination unit 223. As a method by which the encryption necessity determination unit 223 determines the cryptographic key of the received encrypted frame, the encryption necessity determination unit 223 may compare a correspondence table of shared cryptographic keys and MAC addresses recorded in the memory 240 with the destination MAC address and the source MAC address of the received frame so as to determine the cryptographic key, for example.

In FIG. 10, "encrypted" indicates that the frame has already been encrypted and does not need to be decrypted, and the encryption necessity determination unit 223 transmits the frame as the encrypted frame to the switching processing unit 224. "Decryption" indicates that decryption is necessary, and the encryption necessity determination unit 223 adds a decryption flag to the frame and transmits the frame to the switching processing unit 224. "Discard" indicates that the encryption necessity determination unit 223 discards the frame without transmitting it to the switching processing unit 224. For the sake of description, when either "encrypted" or "discard" can be selected, "encrypted or discard" is indicated in FIG. 10. However, in the determination table to be actually used, either one selected by the user is indicated. For example, if the user opts to have the transfer device 200 discard a frame only when the frame is to be transmitted directly to the terminal device 10, the determination table in which "encrypted" is selected for a transfer destination terminal device not directly connected is used. On the other hand, if the user has a frame discarded at the time when it is determined that the transfer device 200 directly connected to the terminal device 10 does not share the cryptographic key, the determination table in which "discard" is selected is used.

In FIG. 10, for the terminal device 10 not directly connected to the transfer device 200b, "encrypted" is indicated if a transfer device 200 directly connected to the terminal device 10 shares the cryptographic key 1, and "encrypted or discard" is indicated if the transfer device 200 directly connected to the terminal device 10 does not share the cryptographic key 1. That is, if the transfer device 200 directly connected to the terminal device 10 shares the cryptographic key 1, this transfer device 200 directly connected to the terminal device 10 can decrypt the frame, so that the transfer device 200b transmits the encrypted frame as the encrypted frame. If not sharing the cryptographic key 1, the transfer device 200 directly connected to the terminal device 10 cannot decrypt the frame, so that processing is performed either to transmit the frame as the encrypted frame or to discard the frame, depending on the user-selected timing to discard the frame, as described above.

In FIG. 10, for the terminal device 10b which is the terminal device 10 directly connected to the transfer device 200b, "decryption" is indicated. This is because the transfer device 200b directly transmits the frame to the terminal device 10b, so that the transfer device 200b needs to decrypt the frame.

The encryption necessity determination unit 223 compares the US 313 and the transfer destination information 342 with the decryption necessity determination table illustrated in FIG. 10 to determine whether or not decryption is necessary, and upon determining that decryption is to be performed, adds a decryption flag 344 to the frame and transmits the frame to the switching processing unit 224.

In FIG. 10, a case where the determination result does not vary depending on the value of the US 313 is described. However, this is not limiting and the determination result may be changed depending on the value of the US 313 as necessary.

FIG. 10 describes the decryption necessity determination table in the case of the cryptographic key 1 which is the cryptographic key shared by the transfer device 200b. However, when the cryptographic key used for the encrypted frame is a cryptographic key not shared by the transfer device 200b, the determination table indicates a determination result of "discard" for the terminal device 10b directly connected to the transfer device 200b. This is because the transfer device 200b directly transfers the frame to the terminal device 10b, so that the frame that cannot be decrypted by the transfer device 200b cannot be interpreted by the terminal device 10b.

Figure 11:
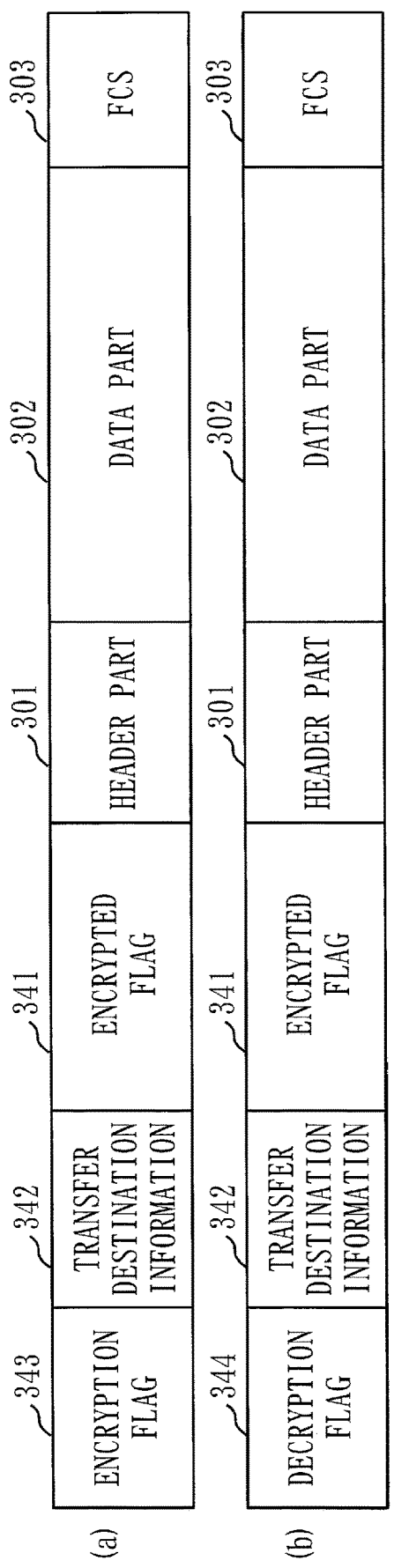
FIG. 11 is a frame configuration diagram illustrating an example of the data configuration of a transmission frame of an encryption necessity determination unit in the first embodiment of the present invention.

FIG. 11 is a frame configuration diagram illustrating an example of the data configuration of a transmission frame of the encryption necessity determination unit in the first embodiment of the present invention. (a) of FIG. 11 is a frame configuration diagram illustrating an example of the data configuration of a transmission frame of the encryption necessity determination unit 223 when encryption is necessary. (b) of FIG. 11 is a frame configuration diagram illustrating an example of the data configuration of a transmission frame of the encryption necessity determination unit 223 when decryption is necessary. (a) of FIG. 11 illustrates the configuration such that the encryption flag 343 is added to the transmission frame of the address filter unit 222 illustrated in FIG. 7. (b) of FIG. 11 illustrates the configuration such that the decryption flag 344 is added to the transmission frame of the address filter unit 222 illustrated in FIG. 7.

Referring back to FIG. 3, if the encryption flag 343 or the decryption flag 344 is included in the frame received from the encryption necessity determination unit 223, the switching processing unit 224 transmits the frame to the encryption decryption processing unit 225. If neither the encryption flag 343 nor the decryption flag 344 is included in the frame, the switching processing unit 224 outputs the frame to the port 210.

If the encryption flag 343 is included in the frame received from the switching processing unit 224, the encryption decryption processing unit 225 encrypts the frame using the cryptographic key stored in the memory 240, deletes the encryption flag 343 from the frame, and transmits the frame to the switching processing unit 224. On the other hand, if the decryption flag 344 is included in the frame received from the switching processing unit 224, the encryption decryption processing unit 225 decrypts the frame using the cryptographic key stored in the memory 240, deletes the decryption flag 344 from the frame, and transmits the frame to the switching processing unit 224.

When two cryptographic keys are recorded in the memory 240, the frame is encrypted using the cryptographic key corresponding to the destination terminal device which is the destination of the received frame.

Figure 12:
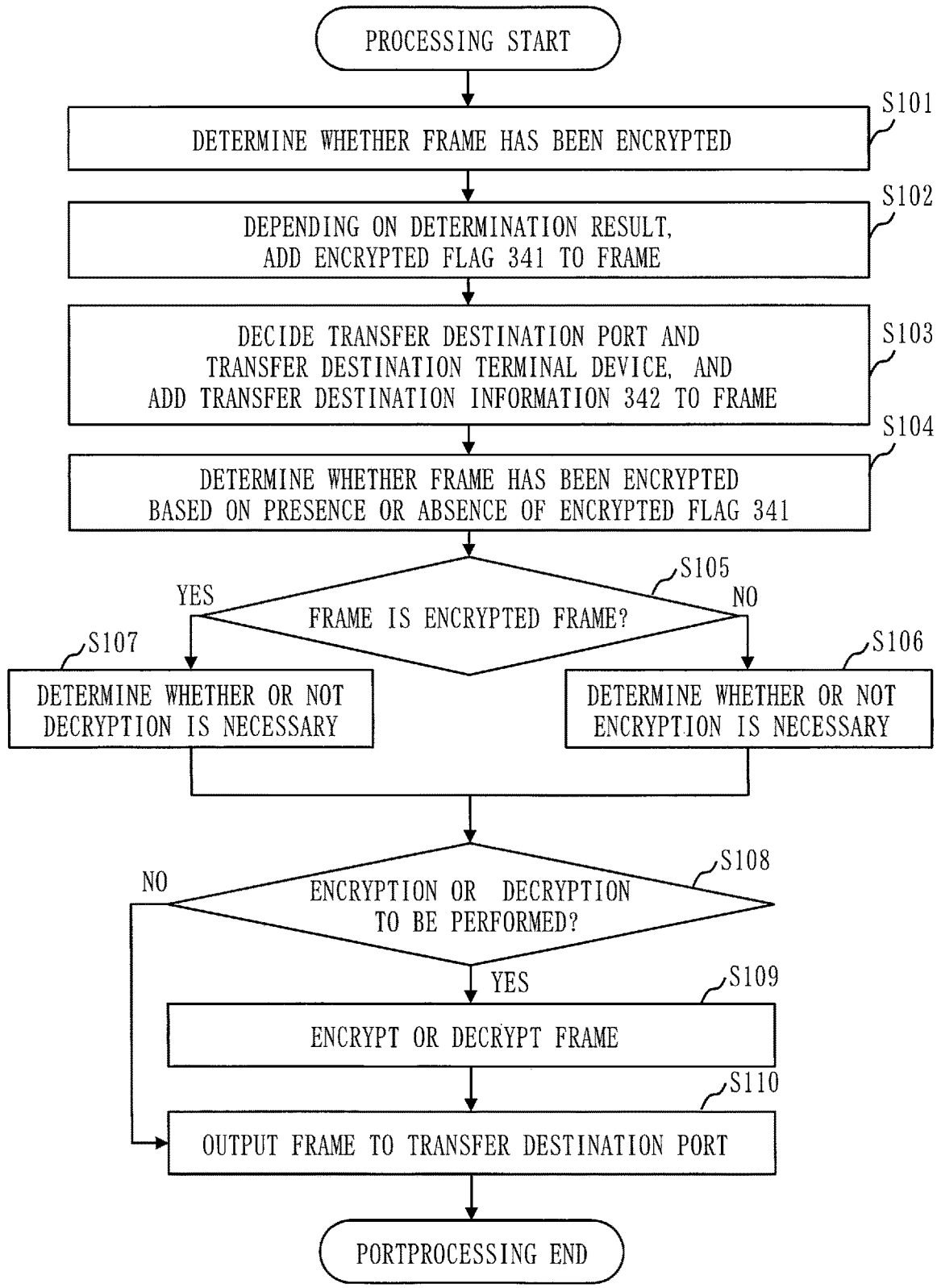
FIG. 12 is a processing flowchart illustrating an example of a flow of processing by a processing unit in the first embodiment of the present invention.

Next, a flow of processing by the processing unit 220 will be described with reference to FIG. 12. FIG. 12 is a flowchart illustrating an example of the flow of processing by the processing unit in the first embodiment of the present invention. The processing unit 220 starts the processing when a frame is input via the port 210.

First, in step S101, the frame identification unit 221 refers to the Ethernet type 316 of the received frame to identify whether the frame is an encrypted frame. When the value is 0x88E5, the frame identification unit 221 identifies that the frame is an encrypted frame.

In step S102, depending on the identification result, the frame identification unit 221 adds the encrypted flag 341 to the frame if the frame is identified as an encrypted frame.

In step S103, the address filter unit 222 compares the destination MAC address which is destination information of the received frame with the transfer destination correspondence table illustrated in FIG. 6 to decide the transfer destination port and the transfer destination terminal device which are the transfer destinations, and adds them to the frame as the transfer destination information 342.

In step S104, the encryption necessity determination unit 223 determines whether or not the frame has been encrypted based on the presence or absence of the encrypted flag 341 added to the frame. If the encrypted flag 341 is not included in the frame, the encryption necessity determination unit 223 determines that the frame has not been encrypted. If the encrypted flag 341 is included in the frame, the encryption necessity determination unit 223 determines that the frame has been encrypted.

In step S105, depending on the determination result in step S104, the encryption necessity determination unit 223 moves the processing to step S106 if the frame has not been encrypted, and moves the processing to step S107 if the frame has been encrypted.

In step S106, the transfer destination information 342 is compared with the encryption necessity determination table illustrated in FIG. 9 to determine whether or not encryption is necessary. If encryption is to be performed, the encryption flag 343 is added to the frame and the processing moves to step S108.

In step S107, the transfer destination information 342 is compared with the decryption necessity determination table illustrated in FIG. 10 to determine whether or not decryption is necessary. If decryption is to be performed, the decryption flag 344 is added to the frame and the processing moves to step S108.

In step S108, if the encryption flag 343 or the decryption flag 344 is included in the frame, the switching processing unit 224 moves the processing to step S109 for encryption or decryption. If neither the encryption flag 343 nor the decryption flag 344 is included in the frame, the switching processing unit 224 moves the processing to step S110.

In step S109, if the encryption flag 343 is included in the frame, the encryption decryption processing unit 225 encrypts the frame using the cryptographic key recorded in the memory 240. If the decryption flag 344 is included in the frame, the encryption decryption processing unit 225 decrypts the frame using the cryptographic key recorded in the memory 240. Then, the encryption decryption processing unit 225 deletes the encryption flag 343 or the decryption flag 344 from the frame.

In step S110, the switching processing unit 224 outputs the frame to the transfer destination port which is the transfer destination in the transfer destination information 342, and then terminates the processing.

As described above, according to the transfer device 200 of the first embodiment, it is possible to determine, with regard to frames belonging to the same VLAN, whether or not encryption is necessary for each frame depending on the attribute, such as priority information, included in the VLAN tag. This has the effect of allowing encrypted communication or plaintext communication to be applied on a per frame basis.

According to the transfer device 200 of the first embodiment, the transfer device 200 can encrypt a frame. This has the effect of allowing encrypted communication to be performed between the terminal devices 10 not having an encryption function.

Figure 13:
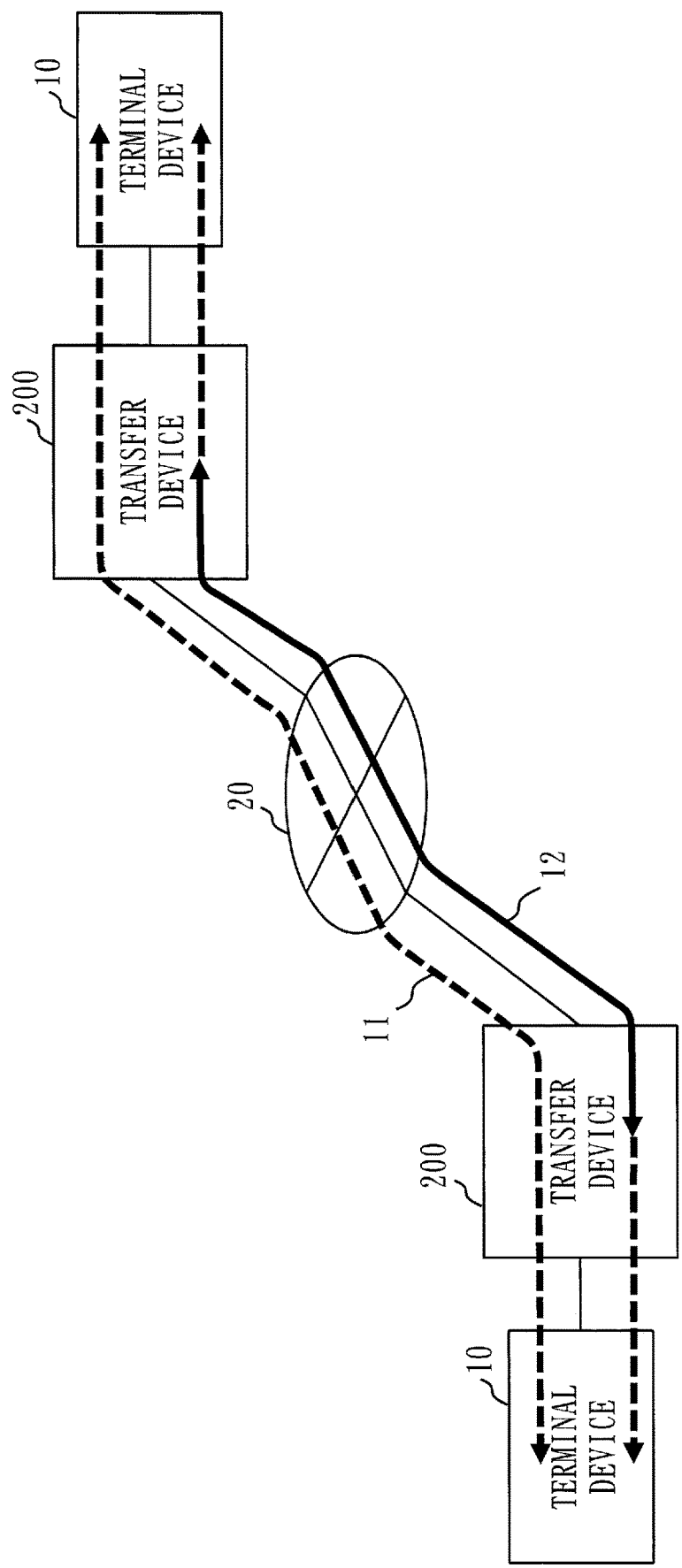
FIG. 13 is an explanatory diagram illustrating an example of effects of the transfer device in the first embodiment of the present invention.

The effects of the transfer device 200 of the first embodiment will be described with reference to FIG. 13. In FIG. 13, arrows indicate a flow of transmission and reception of frames. Arrows represented by a dotted line correspond to plaintext frames, and arrows represented by a solid line correspond to encrypted frames. In FIG. 13, a frame 11 is always a plaintext frame between the terminal devices 10, and a frame 12 is an encrypted frame between the transfer devices 200 and a plaintext frame between the transfer device 200 and the terminal device 10. In this way, the transfer device 200 of the first embodiment can transmit an encrypted frame and a plaintext frame from the same transfer destination port. This has the effect of allowing encrypted communication even in the terminal device 10 not having an encryption function.

As the method for determining whether or not decryption is necessary in the encryption necessity determination unit 223, the case where the decryption necessity determination table illustrated in FIG. 10 is used has been described. This is not limiting and a determination may be made based on cryptographic key sharing information and whether the transfer destination port which is the transfer destination is a transfer destination port directly connected to a terminal device 10 or a transfer destination port linked with a transfer device 200. A method by which the encryption necessity determination unit 223 determines whether the transfer destination port is a port directly connected to a terminal device 10 may be, for example, such that information on a directly connected terminal device 10 is recorded in the memory 240, and when the terminal device 10 recorded in the memory 240 coincides with the transfer destination terminal device decided by the address filter unit 222 using the transfer destination correspondence table illustrated in FIG. 6, the port 120 which is the transfer destination port is determined as a transfer destination port directly connected to the terminal device 10. Note that the transfer destination port linked with a transfer device 200 refers to a port other than a transfer destination port directly connected to a terminal device 10, and refers to a transfer destination port directly connected to the transfer device 200 or a transfer destination port linked with a transfer device 200 connected to the final destination terminal device via the relay network 20 or the like.

FIG. 14 is a database configuration diagram illustrating an example of the decryption necessity determination table in the first embodiment of the present invention. FIG. 14 is the determination table for determining whether or not decryption is necessary for each transfer destination port. When the transfer destination port is "terminal device 10", this indicates that the transfer destination port is a transfer destination port directly connected to a terminal device 10. When the transfer destination port is "transfer device 200", this indicates that the transfer destination port is a transfer destination port linked with a transfer device 200. In FIG. 14, a terminal device 10 not sharing the cryptographic key indicates that the cryptographic key used for a received encrypted frame is not shared by the transfer device 200 that determines whether or not decryption is necessary. FIG. 14 is a database recorded in the memory 240 and referred to by the encryption necessity determination unit 223. It is assumed that transfer destination ports have a one-to-one correspondence with the ports 210. However, in a network where a VLAN is configured, a plurality of transfer destination ports can be set in the same port 210 by configuring the VLAN.

In FIG. 14, when the cryptographic key is shared and the transfer destination port is a terminal device 10, "decryption" is indicated. When the cryptographic key is shared and the transfer destination port is a transfer device 200, "encrypted" is indicated. On the other hand, when the cryptographic key is not shared and the transfer destination port is a terminal device 10, "discard" is indicated. When the cryptographic key is not shared and the transfer destination port is a transfer device 200, "encrypted or discard" is indicated. Using FIG. 14, the encryption necessity determination unit 223 determines whether or not decryption is necessary for the received encrypted frame.

When the encryption necessity determination unit 223 determines whether or not decryption is necessary in this way, this has the effect of reducing the volume of data recorded in the memory 240, compared with the method of determining whether or not decryption is necessary using the decryption necessity determination table illustrated in FIG. 10.

SECOND EMBODIMENT

In the first embodiment described above, the frame identification unit 221 determines whether or not a frame has been encrypted, and if encrypted, adds the encrypted flag 341 to the frame. In a second embodiment to be described, a frame identification unit 221 further extracts, from a frame, information related to the transfer destination and information related to determination as to whether or not encryption is necessary, and adds these pieces of information to the frame as an internal header. The structure of a communication network 100 and the structure of a transfer device 200 are substantially the same as those of the first embodiment, and thus description will be omitted.

From the frame illustrated in FIG. 4, the frame identification unit 221 extracts either one or both of the destination MAC address 311 and the source MAC address 312 as transfer destination related information 345 which is information related to the transfer destination of the frame, and extracts the US 313, the VLAN-ID 315, the Ethernet type 316, and the like as encryption necessity related information 346 which is information related to whether or not encryption is necessary. In the following, an example in which the frame identification unit 221 extracts the destination MAC address 311 as the transfer destination related information 345 and the US 313 as the encryption necessity related information 346 will be described.

Figure 15:
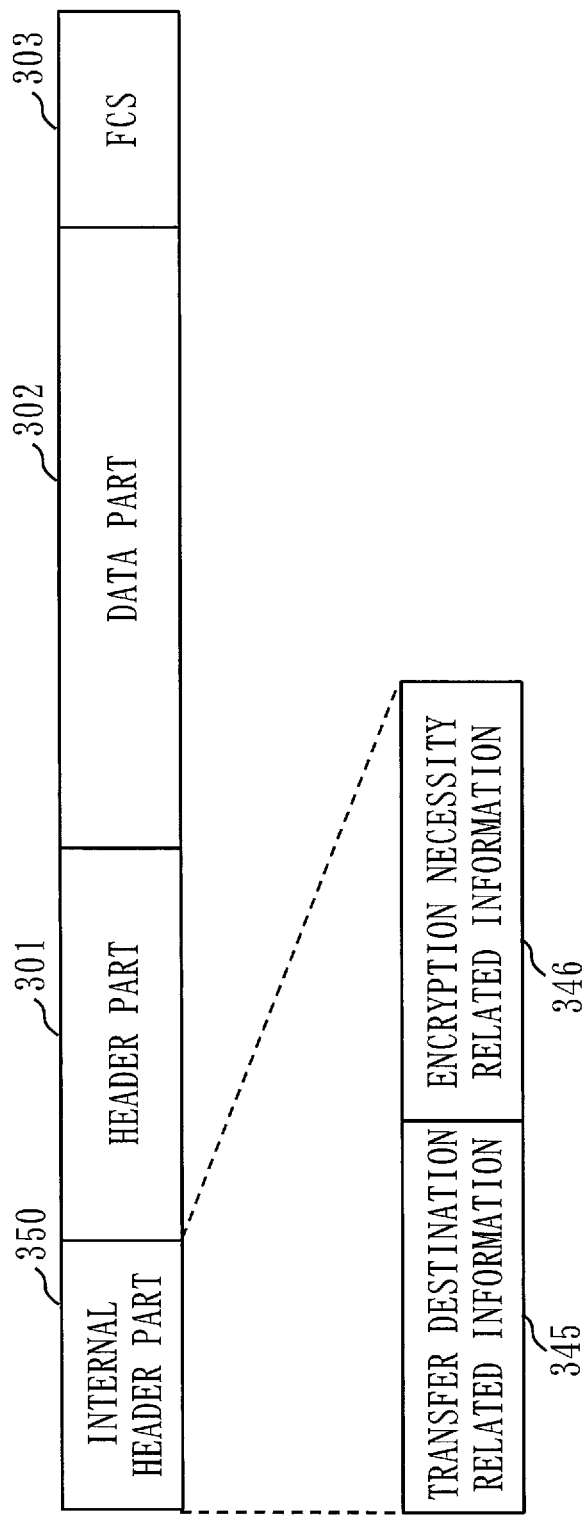
FIG. 15 is a frame configuration diagram illustrating an example of the data configuration of a transmission frame of a frame identification unit in a second embodiment of the present invention.

The frame identification unit 221 adds the extracted transfer destination related information 345 and encryption necessity related information 346 to the frame as an internal header 350, and transmits the frame to the address filter unit 222. FIG. 15 is a frame configuration diagram illustrating an example of the data configuration of a transmission frame of the frame identification unit in the second embodiment of the present invention. In FIG. 15, the internal header 350 is composed of the transfer destination related information 345 which is information related to the transfer destination of the frame and the encryption necessity related information 346 which is information related to whether or not encryption is necessary for the frame. Here, the destination MAC address 311 extracted by the frame identification unit 221 is the transfer destination related information 345, and the US 313 is the encryption necessity related information 346.

The case where the frame has not been encrypted is described. However, even from an encrypted frame, the transfer destination related information 345 and the encryption necessity related information 346 may be extracted from the header part 301 which has not been encrypted.

Upon receiving the frame to which the internal header 350 has been added, the address filter unit 222 decides the transfer destination port and the transfer destination terminal device of the frame based on the transfer destination related information 345 in the internal header 350, and the encryption necessity determination unit 223 determines whether or not encryption is necessary for the frame based on the encryption necessity related information 346 in the internal header 350.

As described above, according to the transfer device 200 of the second embodiment, using the internal header 350 extracted and added to the frame in the frame identification unit 221, the address filter unit 222 and the encryption necessity determination unit 223 can decide the transfer destination of the frame and determine whether or not encryption is necessary for the frame, respectively. This has the effect of making it unnecessary for each of the address filter unit 222 and the encryption necessity determination unit 223 to search for a relevant portion of the frame, thereby increasing processing speed.

As a method by which the frame identification unit 221 transmits the transfer destination related information 345 and the encryption necessity related information 346 to the address filter unit 222 and the encryption necessity determination unit 223, the method of adding these pieces of information to the frame as the internal header 350 has been described. However, this is not limiting and a signal line connecting the frame identification unit 221 and the address filter unit 222 and a signal line connecting the frame identification unit 221 and the encryption necessity determination unit 223 may be provided to directly transmit the transfer destination related information 345 and the encryption necessity related information 346. When the signal lines are provided for transmission in this way, this has the effect of preventing the data volume of the frame from increasing due to the data volume of the transfer destination related information 345 and the encryption necessity related information 346.

In the method described above, the frame identification unit 221 transmits information included in the frame as it is to the address filter unit 222 and the encryption necessity determination unit 223 as the transfer destination related information 345 and the encryption necessity related information 346. However, this is not limiting and the frame identification unit 221 may transmit processed information as the transfer destination related information 345 and the encryption necessity related information 346. For example, the frame identification unit 221 may obtain a priority identification result from the US 313 and transmit the frame in which the priority identification result is added to the internal header 350 as the encryption necessity related information 346 to the address filter unit 222 and the encryption necessity determination unit 223.

FIG. 16 is a priority identification result correspondence table illustrating an example of the priority identification result in the second embodiment of the present invention. In FIG. 16, the US 313 of 0 to 1 corresponds to a low priority, the US 313 of 2 to 3 corresponds to a medium priority, the US 313 of 4 to 5 corresponds to a high priority, and the US 313 of 6 to 7 corresponds to a highest priority. Based on the correspondence table of FIG. 16, the frame identification unit 221 obtains the priority identification result as the encryption necessity related information 346. FIG. 16 is a database recorded in the memory 240 and referred to by the frame identification unit 221.

As the encryption necessity determination table used by the encryption necessity determination unit 223 to determine whether or not encryption is necessary, the determination table using information originally included in the frame, such as the US 313 illustrated in FIG. 9, has been described. However, this is not limiting and a determination table using information obtained by the frame identification unit 221, such as the priority identification result illustrated in FIG. 16, may also be used.

FIG. 17 is a database configuration diagram illustrating an example of the encryption necessity determination table in the second embodiment of the present invention. FIG. 17 is the determination table on the basis of the priority identification result, in place of the US 313 in FIG. 9, and the transfer destination terminal device. The priority identification result consists of four levels: the highest priority, the high priority, the medium priority, and the low priority. This has the effect of a smaller data volume compared with the determination table using the US 313 illustrated in FIG. 9. FIG. 17 differs from FIG. 9 only in that the US 313 is replaced with the priority identification result, and thus description will be omitted. FIG. 17 is a database recorded in the memory 240 and referred to by the encryption necessity determination unit 223.

In the description above, only layer-2 header information is used as the information related to the transfer destination. However, when the frame has not been encrypted, the transfer device 200 may perform transfer processing using upper-layer information in addition to the layer-2 information. In the following, a case where a MAC frame carries a Transmission Control Protocol (TCP)/IPv4 frame, as illustrated in FIG. 18, will be described as an example.

FIG. 18 is a frame configuration diagram illustrating an example of the data configuration of a frame in the second embodiment of the present invention. (a) of FIG. 18 illustrates the configuration of the frame illustrated in FIG. 4.

(b) of FIG. 18 illustrates the structure of an IPv4 frame, and the IPv4 frame is composed of an IPv4 header and other information 367 which is a data part. The IPv4 header includes IP version information 361, a Type of Service (TOS) 362, a protocol number 363, a source IP address 364, a destination IP address 365, and other header information 366. Note that (b) of FIG. 18 is intended to illustrate information included in the IP frame, and does not illustrate the exact structure of the IP frame.

The IP version information 361 is a value indicating the type of communication protocol, and 4 is used for the IPv4 frame.

The TOS 362 is a value indicating the type of communication, and a value indicating the priority of the frame. The value of the TOS 362 ranges from 0 to 7, and 0 is specified as the lowest priority and 7 is specified as the highest priority.

The protocol number 363 is a number for identifying the upper-layer communication protocol. For example, 6 indicates the TCP communication protocol.

The destination IP address 365 and the source IP address 364 are IP addresses corresponding to the third layer which are numbers for identifying the terminal device 10 to which the frame is transmitted and the terminal device 10 from which the frame is transmitted, respectively.

(c) of FIG. 18 illustrates the structure of a TCP frame composed of a TCP header and other information 374 which is a data part. The TCP header includes a source logical port number 371, a destination logical port number 372, and other header information 373. Note that (c) of FIG. 18 is intended to illustrate information included in the TCP frame, and does not illustrate the exact structure of the TCP frame.

The destination logical port number 372 and the source logical port number 371 are numbers assigned to virtual ports connected to the terminal device 10 to which the frame is transmitted and the terminal device 10 from which the frame is transmitted, respectively, and the value of each number ranges from 0 to 65535.

When the transfer device 200 in the second embodiment performs transfer processing of the MAC frame including the TCP/IPv4 frames illustrated in FIG. 18, any of the destination MAC address 311, the source MAC address 312, the destination IP address 365, the source IP address 364, the destination logical port number 372, and the source logical port number 371 is extracted as the transfer destination related information 345, and any of the US 313, the VLAN-ID 315, the Ethernet type 316, the TOS 362, and the protocol number 363 is extracted as the encryption necessity related information 346.

As described above, based on the extracted transfer destination related information 345, the address filter unit 222 decides the transfer destination terminal device which is the final destination and the encryption necessity determination unit 223 determines whether or not encryption is necessary and whether or not decryption is necessary. For example, a determination may be performed based on an encryption necessity determination table using the TOS 362 in place of the US 313 in the encryption necessity determination table illustrated in FIG. 9.

THIRD EMBODIMENT

In the first embodiment described above, the processing unit 220 of the transfer device 200 includes the frame identification units 221, the address filter units 222, and the encryption necessity determination units 223 corresponding to the respective ports. In a third embodiment to be described, frames transmitted from each port are multiplexed once before being transmitted to each unit. The configuration of a communication network is substantially the same as that in the first embodiment, and thus description will be omitted. The configuration of a transfer device 200 differs only in that the processing unit 220 in the first embodiment is replaced with a processing unit 420, and thus description will be omitted.

Figure 19:
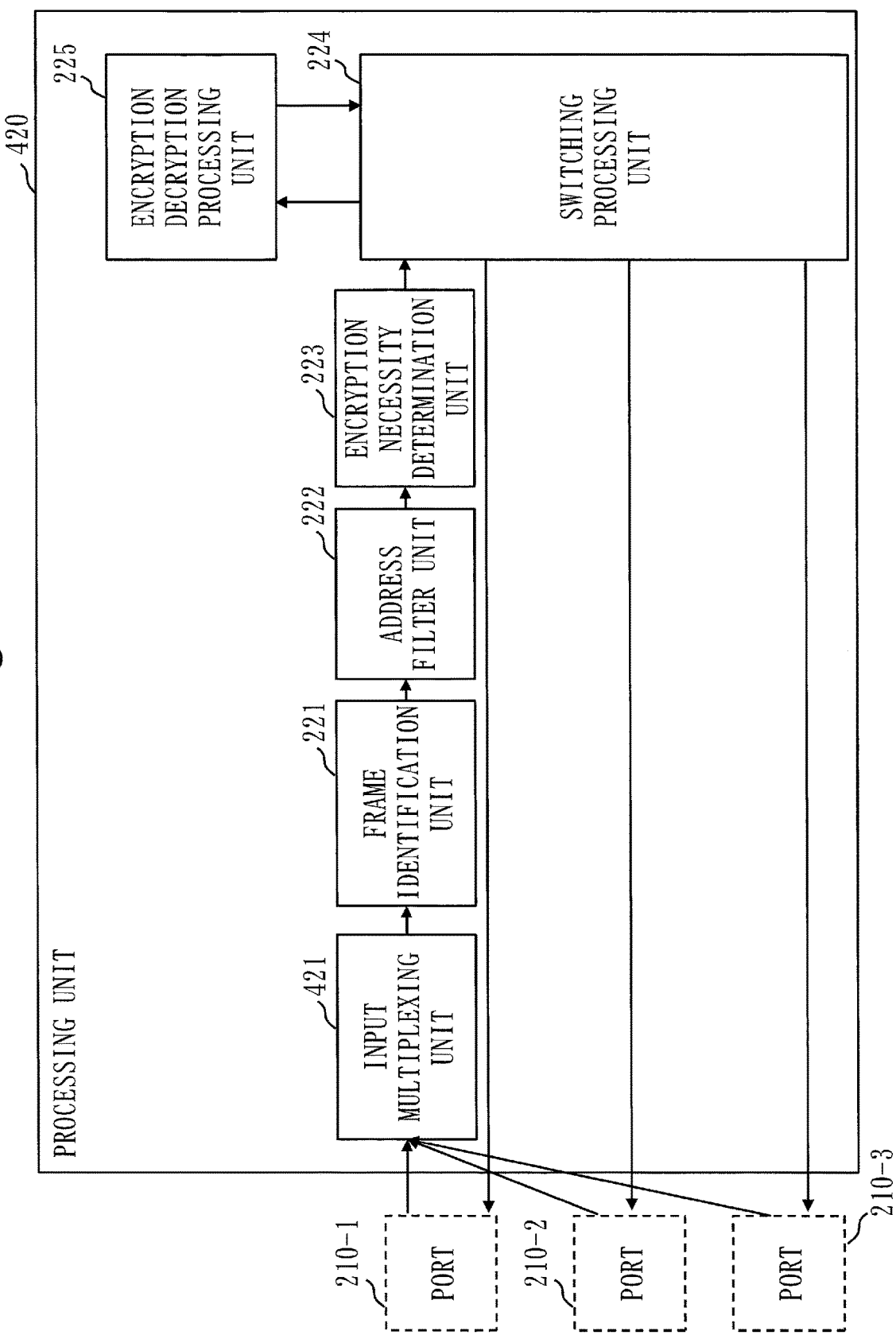
FIG. 19 is a configuration diagram illustrating an example of the configuration of a processing unit in a third embodiment of the present invention.

FIG. 19 is a configuration diagram illustrating an example of the configuration of the processing unit in the third embodiment of the present invention. The configuration of the processing unit 420 in FIG. 19 differs from that of the processing unit 220 of the first embodiment in that an input multiplexing unit 421 is added and there are one frame identification unit 221, one address filter unit 222, and one encryption necessity determination unit 223. For the sake of description, FIG. 19 illustrates ports 210 (210-1 to 210-3) in addition to the processing unit 420.

In FIG. 19, frames are input to the input multiplexing unit 421 from each of the ports 210, and the input multiplexing unit 421 multiplexes the input frames and transmits a multiplexed frame to the frame identification unit 221. The frame identification unit 221, the address filter unit 222, the encryption necessity determination unit 223, a switching processing unit 224, and an encryption decryption processing unit 225 perform processing on the frame multiplexed by the input multiplexing unit 421.

The frame identification unit 221, the address filter unit 222, the encryption necessity determination unit 223, the switching processing unit 224, the encryption decryption processing unit 225 are substantially the same as those in the first embodiment, and thus description will be omitted. A flow of processing by the processing unit 420 is such that only processing to multiplex frames in the input multiplexing unit 421 is added to the processing unit 220 of the first embodiment, and thus description will be omitted.

As described above, according to the transfer device 200 of the third embodiment, the processing unit 420 includes the input multiplexing unit 421. This has the effect of reducing the number of the frame identification units 221, the address filter units 222, and the encryption necessity determination units 223 to constitute the processing unit 420, thereby reducing the circuit scale of the processing unit 420.

In the description above, the processing unit 420 includes one frame identification unit 221, one address filter unit 222, and one encryption necessity determination unit 223. However, two or more of these units may be included, depending on the number of connected ports.

FOURTH EMBODIMENT

A fourth embodiment describes a transfer device 200 in which a switching processing unit 224 has two transmission lines: a transmission line for transmitting and receiving frames to be encrypted or decrypted and a transmission line where neither encryption nor decryption is performed. The configuration of a communication network 100 and the configuration of the transfer device 200 are substantially the same as those in the first embodiment, and thus description will be omitted.

Figure 20:
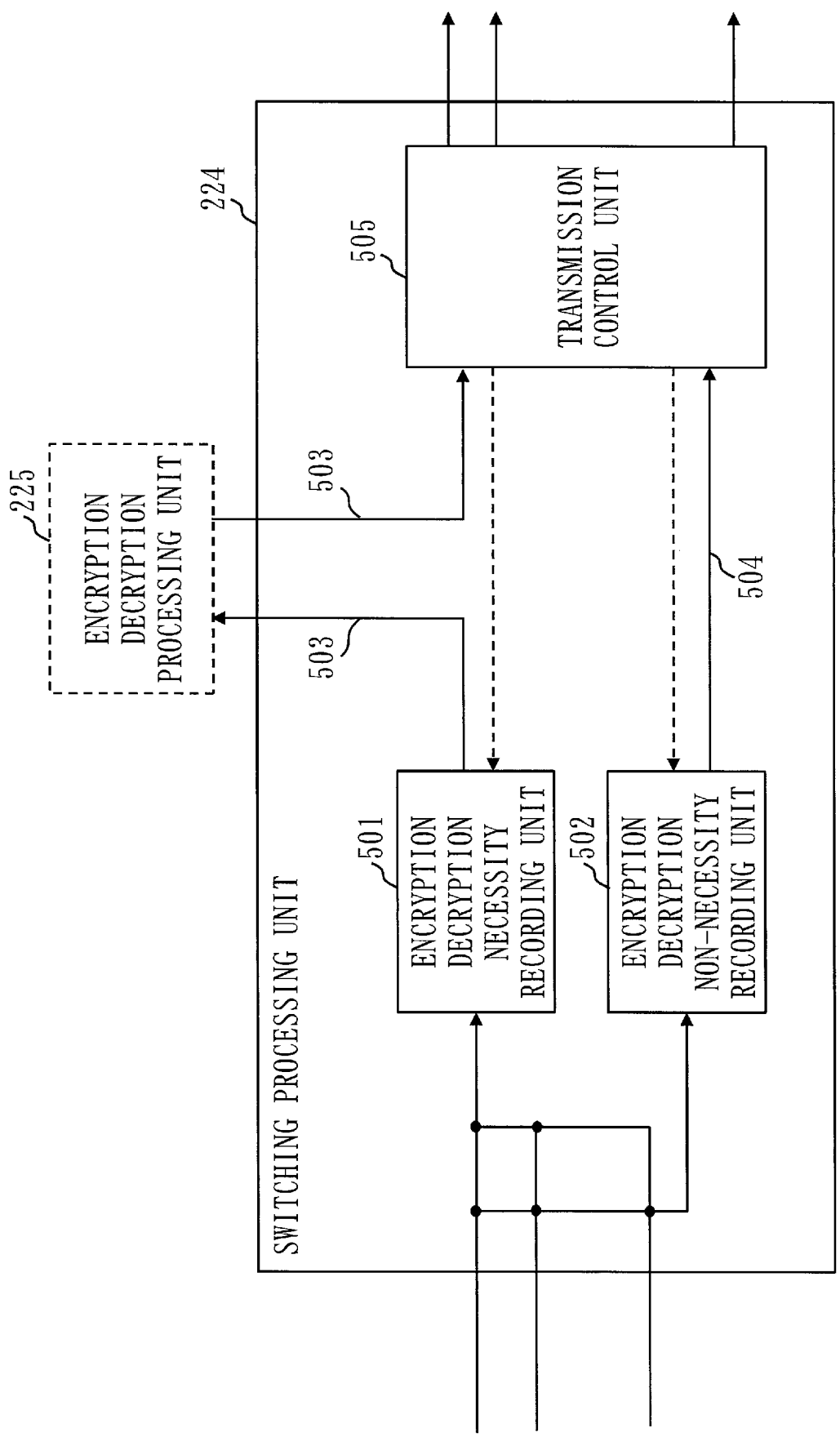
FIG. 20 is a configuration diagram illustrating an example of a switching processing unit in a fourth embodiment of the present invention.

FIG. 20 is a configuration diagram illustrating an example of the switching processing unit in the fourth embodiment of the present invention. The switching processing unit 224 in FIG. 20 includes an encryption decryption necessity recording unit 501 having a queue for recording frames to be encrypted or decrypted, an encryption decryption non-necessity recording unit 502 having a queue for recording frames to be neither encrypted nor decrypted, an encryption decryption path 503 for transmitting and receiving frames to be encrypted or decrypted, a low delay path 504 for transmitting and receiving frames as they are with a low delay without performing encryption or decryption, and a transmission control unit 505 that controls timing to transmit frames. The transmission control unit 505 controls transmission of frames from the encryption decryption necessity recording unit 501 and the encryption decryption non-necessity recording unit 502 and transmission of frames to each port 210 (not illustrated). In the drawing, solid lines indicate transmission and reception of data, and dotted lines indicate control instructions. For the sake of description, an encryption decryption processing unit 225 connected to the switching processing unit 224 is illustrated.

In FIG. 20, the encryption decryption necessity recording unit 501 receives frames including an encryption flag or a decryption flag, and the encryption decryption non-necessity recording unit 502 receives frames including neither an encryption flag nor a decryption flag.

The encryption decryption necessity recording unit 501 has the queue for recording frames to be encrypted or decrypted. When an instruction to transmit a frame is received from the transmission control unit 505, the encryption decryption necessity recording unit 501 transmits the oldest piece of information recorded in the queue to the encryption decryption processing unit 225 via the encryption decryption path 503.

The encryption decryption non-necessity recording unit 502 has the queue for recording frames to be neither encrypted nor decrypted. When an instruction to transmit a frame is received from the transmission control unit 505, the encryption decryption non-necessity recording unit 502 transmits the oldest piece of information recorded in the queue to the transmission control unit 505 via the low delay path 504.

The transmission control unit 505 instructs the encryption decryption necessity recording unit 501 and the encryption decryption non-necessity recording unit 502 to transmit a frame. Upon receiving a frame transmitted from the encryption decryption processing unit 225, the transmission control unit 505 controls transmission of the frame to each port 210 (not illustrated) in accordance with the transfer destination information 342 included in the frame.

As described above, according to the transfer device 200 of the fourth embodiment, the switching processing unit 224 has the encryption decryption path 503 and the low delay path 504. This has the effect of providing different transmission routes for frames that need to be encrypted or decrypted and frames that do not need to be encrypted or decrypted, and allowing the transfer device 200 to prevent a delay in transmitting frames that do not need to be encrypted or decrypted.

REFERENCE SIGNS LIST

1: VLAN; 2: VLAN; 10: terminal device; 11, 12: frame; 20: relay network; 30: transmission line; 100: communication network; 200: transfer device; 210: port; 220, 420: processing unit; 230: control unit; 240: memory; 250: interface; 260: local bus; 221: frame identification unit; 222: address filter unit; 223: encryption necessity determination unit; 224: switching processing unit; 225: encryption decryption processing unit; 421: input multiplexing unit; 501: encryption decryption necessity recording unit; 502: encryption decryption non-necessity recording unit; 503: encryption decryption path; 504: low delay path; 505: transmission control unit

The invention claimed is:
1. A transfer device comprising:
a plurality of ports to and from each of which a frame of a layer 2 is input and output; and
processing circuitry to:
identify whether or not the frame received at one of the plurality of ports has been encrypted;
decide one of the plurality of ports from which the frame is to be output;

store an encryption necessity determination table in which whether or not encryption is necessary for each frame is defined depending on destination information and priority information which are included in each frame, and a decryption necessity determination table in which whether or not decryption is necessary is defined depending on the destination information included in each frame, and when the frame has been identified as not being encrypted, determine whether or not encryption is necessary for the frame based on the encryption necessity determination table, and when the frame has been identified as being encrypted, determine whether or not decryption is necessary for the frame based on the decryption necessity determination table;

encrypt the frame for which it has been determined that encryption is necessary, and decrypt the frame for which it has been determined that decryption is necessary; and output the frame for which it has been determined that encryption is not necessary or decryption is not necessary and the frame that has been encrypted or decrypted to the decided port, wherein the frame includes information on an upper layer above the layer 2, wherein the processing circuitry decides the port for output based on destination information included in the information on the upper layer, wherein the encryption necessity determination table is a determination table depending on the destination information and priority information which are included in the information on the upper layer, and wherein the decryption necessity determination table is a determination table depending on the destination information included in the information on the upper layer.

2. The transfer device according to claim 1, wherein the processing circuitry multiplexes frames input from the plurality of ports, and performs processing on a multiplexed frame.

3. The transfer device according to claim 1, wherein the processing circuitry has an encryption decryption path through which a frame to be encrypted or decrypted passes and a low delay path through which a frame not to be encrypted or decrypted passes.

4. A communication network comprising:

the transfer device according to claim 1;

a terminal device to generate the frame; and a relay network to connect the transfer device with another transfer device.

* * * * *